Jan. 2, 1951 E. V. NYBERG 2,536,512

TENS TRANSFER MECHANISM FOR CALCULATING MACHINES

Filed Dec. 18, 1946

10 Sheets-Sheet 1

INVENTOR
Ernst V. Nyberg
BY Darby + Darby
ATTORNEYS

Jan. 2, 1951 E. V. NYBERG 2,536,512

TENS TRANSFER MECHANISM FOR CALCULATING MACHINES

Filed Dec. 18, 1946 10 Sheets-Sheet 2

INVENTOR
Ernst V. Nyberg
BY Darby & Darby
ATTORNEYS

Jan. 2, 1951 E. V. NYBERG 2,536,512

TENS TRANSFER MECHANISM FOR CALCULATING MACHINES

Filed Dec. 18, 1946 10 Sheets-Sheet 3

INVENTOR
Ernst V. Nyberg
BY Darby & Darby
ATTORNEYS

Jan. 2, 1951    E. V. NYBERG    2,536,512

TENS TRANSFER MECHANISM FOR CALCULATING MACHINES

Filed Dec. 18, 1946    10 Sheets-Sheet 4

INVENTOR
Ernst V. Nyberg
BY Darby + Darby
ATTORNEYS

TENS TRANSFER MECHANISM FOR CALCULATING MACHINES

Filed Dec. 18, 1946 10 Sheets-Sheet 5

INVENTOR
Ernst V. Nyberg
BY Darby + Darby
ATTORNEYS

INVENTOR
Ernst V. Nyberg
BY Darby + Darby
ATTORNEYS

Jan. 2, 1951 E. V. NYBERG 2,536,512

TENS TRANSFER MECHANISM FOR CALCULATING MACHINES

Filed Dec. 18, 1946 10 Sheets-Sheet 7

INVENTOR
Ernst V. Nyberg
BY Darby & Darby
ATTORNEYS

TENS TRANSFER MECHANISM FOR CALCULATING MACHINES

Filed Dec. 18, 1946 10 Sheets-Sheet 8

INVENTOR
Ernst V. Nyberg
BY Darby & Darby
ATTORNEYS

Jan. 2, 1951 E. V. NYBERG 2,536,512

TENS TRANSFER MECHANISM FOR CALCULATING MACHINES

Filed Dec. 18, 1946 10 Sheets-Sheet 9

INVENTOR
Ernst V. Nyberg
BY Darby & Darby
ATTORNEYS

Jan. 2, 1951 E. V. NYBERG 2,536,512

TENS TRANSFER MECHANISM FOR CALCULATING MACHINES

Filed Dec. 18, 1946 10 Sheets-Sheet 10

INVENTOR
Ernst V. Nyberg
BY Darby + Darby
ATTORNEYS

Patented Jan. 2, 1951

2,536,512

UNITED STATES PATENT OFFICE 2,536,512

TENS TRANSFER MECHANISM FOR CALCULATING MACHINES

Ernst Vilhelm Nyberg, Lidingo, Sweden, assignor to Aktiebolaget Cryptoteknik, Stockholm, Sweden, a corporation of Sweden Application December 18, 1946, Serial No. 717,005
In Sweden March 29, 1944

Section 1, Public Law 690, August 8, 1946
Patent expires March 29, 1964

1 Claim. (Cl. 235—137)

The present invention refers to improvements in calculating machines, cash registers and the like for carrying out operations of addition and also of subtraction.

The chief object of this invention is to essentially simplify such machines, rendering them at the same time more reliable in operation.

Another object of the invention is to simplify the tens transfer means and to render them more reliable in operation.

According to the invention also selection of the kind of operation and the selection of the totalizers is simplified.

Another object of this invention is to render the tens transfer mechanism very compact in the axial direction, thus rendering it possible to use a very small pitch of the totalizer in the axial direction. This means that the numerals in the totalizer stand closely together and are easily readable.

Another object of this invention is to simplify the construction of the printing mechanism and the type bars. Because of the small axial pitch of the totalizer, the same pitch may be used also for the type bars in the axial (i. e. transverse) direction. Each type bar can, therefore, be arranged in the same plane as its corresponding totalizer wheel with its tens transfer means, and these planes are parallel.

In this description, when not otherwise expressly stated, the expressions "right", "left", "upwards", "downwards", "front", "rear", are used to indicate these directions as they appear to an operator sitting at the keyboard of the machine.

One embodiment of a machine according to the invention is illustrated in the annexed drawings.

Figure 5:
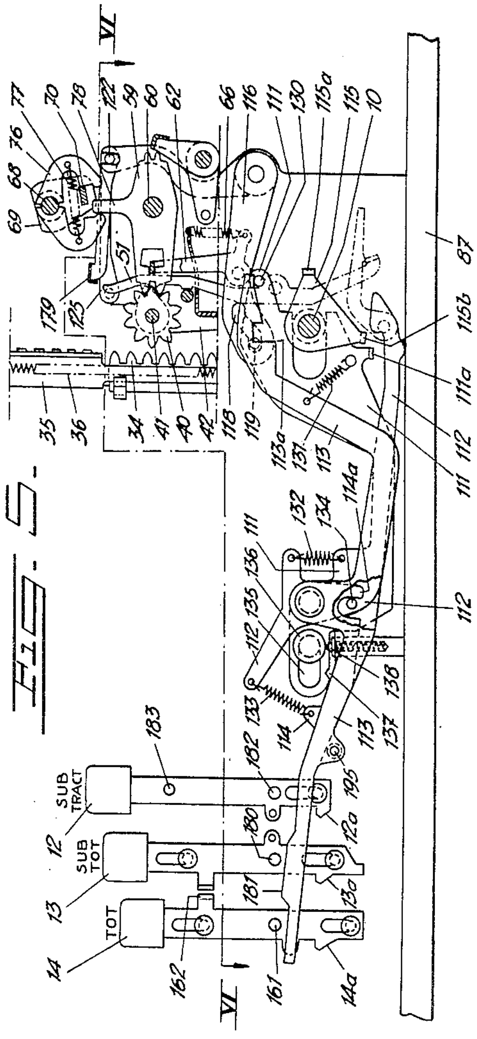
Fig. 5 is a detail view (a partial side view) of certain parts, and illustrates especially the initial position (the position of rest) of the totalizer and of the shifting mechanism located between the totalizer and the kind of operation keys.
Figures 11, 12, 13, 14:
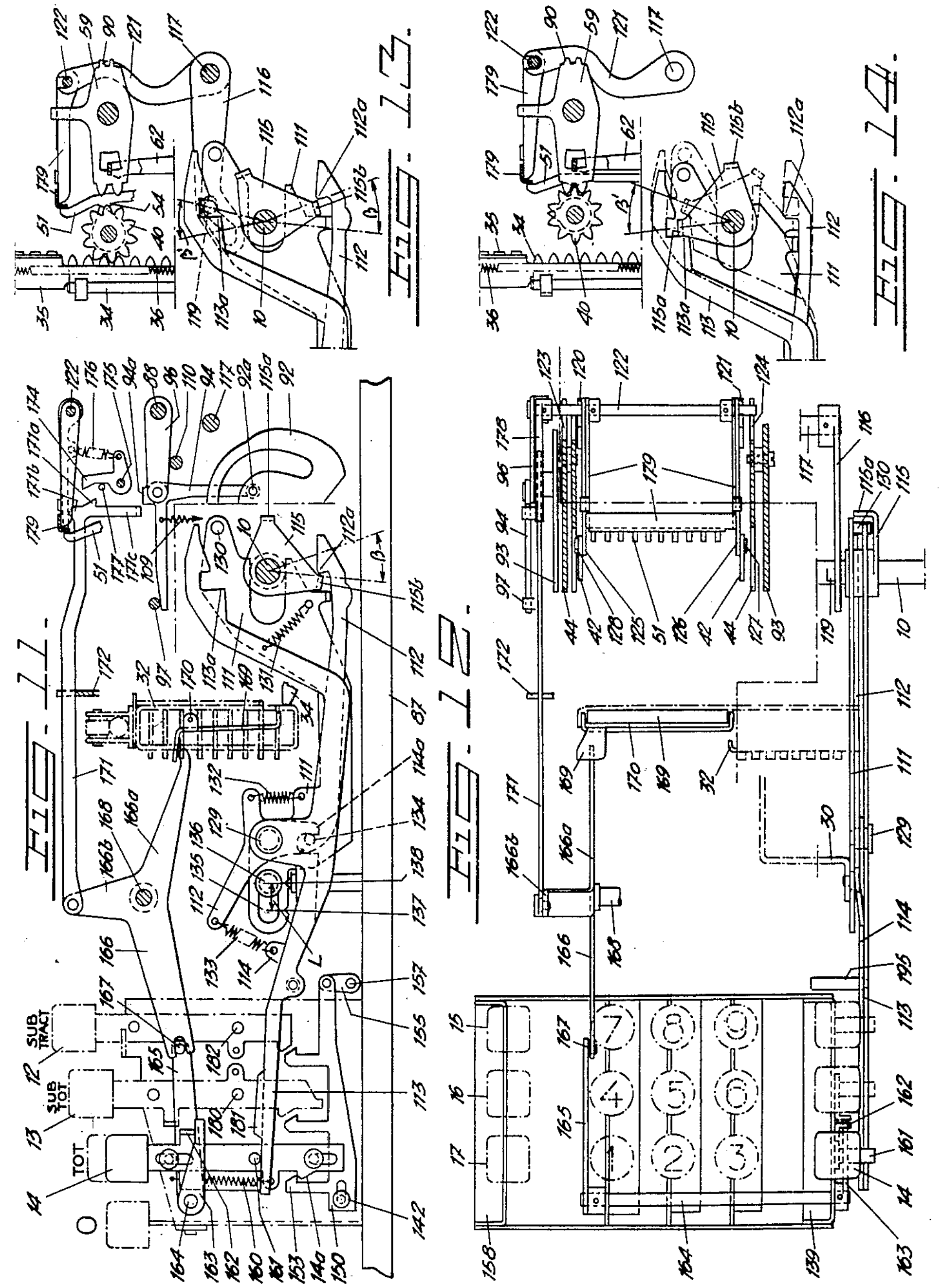

Fig. 11 which is analogous to Fig. 5 shows a partial side view of certain parts, and illustrates especially the primary setting of the shifting levers and of the link connections immediately after the depression of the totalizer key (before the operation of the machine has begun).

Fig. 12 shows a plan view of the parts shown in Fig. 11.

Fig. 13 is a partial side view—analogous to the right part of Fig. 5—and illustrates especially the position of the totalizer wheel when the corresponding type bar has reached its uppermost position (= position for printing the total) at the total taking operation.

Fig. 14 is a partial side view—analogous to Fig. 13—and illustrates especially the position of the totalizer wheel and the shifting levers after the latter have been restored to their initial positions (positions of rest) after a total-taking operation. (In Fig. 14 the tens transfer releasers are thus locked in their positions of rest, while they are shown in their active position in Fig. 5.)

Figures 15, 16, 21, 22:
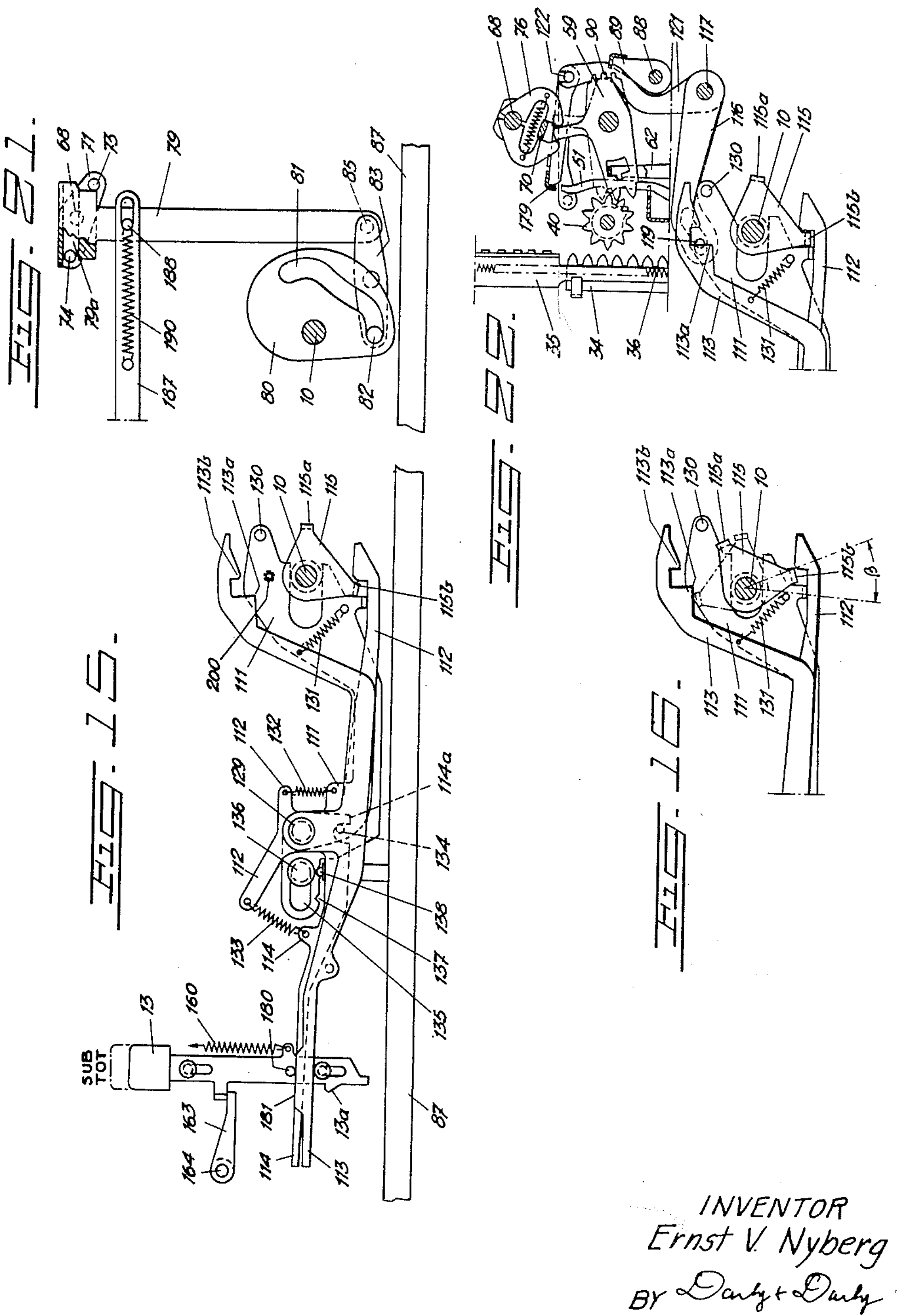

Fig. 15 shows a partial side view analogous to the left part of Figs. 5 and 11, and illustrates especially the setting of the shifting levers immediately after the subtotal key has been depressed (but before the operation of the machine has begun).

Fig. 16 shows the right part of Fig. 15 with the parts in the position which they assume at a latter stage of the subtotal-taking operation.

Figures 17, 18, 19, 20:
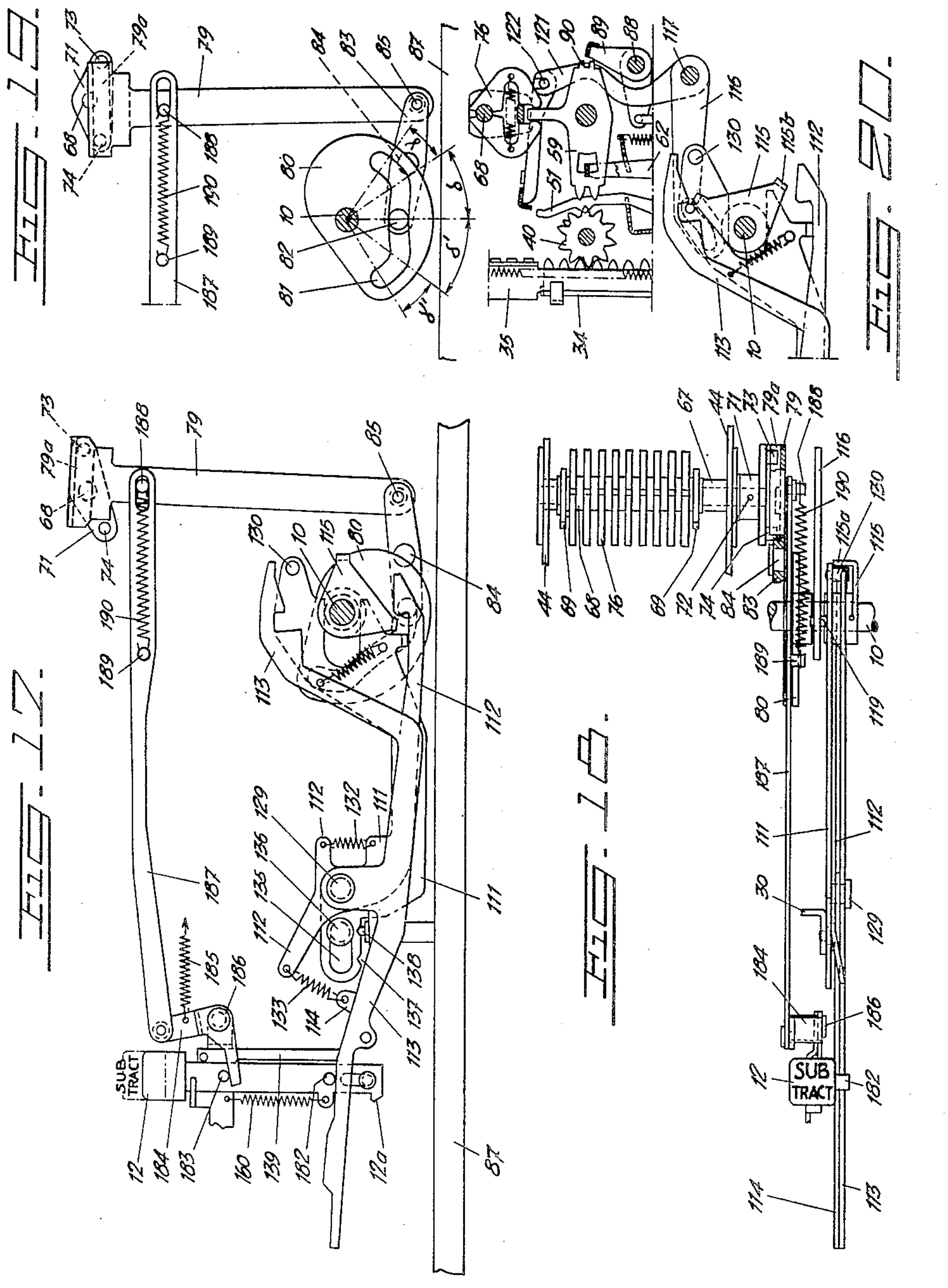

Fig. 17 shows a partial side view analogous to Fig. 15, and illustrates especially the positions of the shifting levers immediately after depression of the subtraction key (that is: before the operation of the machine has begun).

Fig. 18 shows a plan view of the parts illustrated in Fig. 17.

Fig. 19 shows a detail view of the mechanism for setting the shaft for changing over the tens transfer from addition to subtraction and vice versa; the figure illustrates the neutral position (position of rest) for this mechanism and for the shaft for changing over the tens transfer.

Fig. 20 shows a partial side view analogous to Figs. 13 and 14, and illustrates especially the position of the totalizer wheels and the shifting levers at an operation of subtraction after a tens transfer has been prepared.

Fig. 21 shows a detail view analogous to Fig. 19, and illustrates especially the subtraction position of the mechanism for setting the shaft for changing over the tens transfer.

Fig. 22 shows a partial side view analogous to Fig. 20, and illustrates especially the position of the totalizer wheels and the shifting levers after they have been restored to their initial positions and after an operation of subtraction a tens transfer has been effected in the direction for subtraction.

Figure 23:
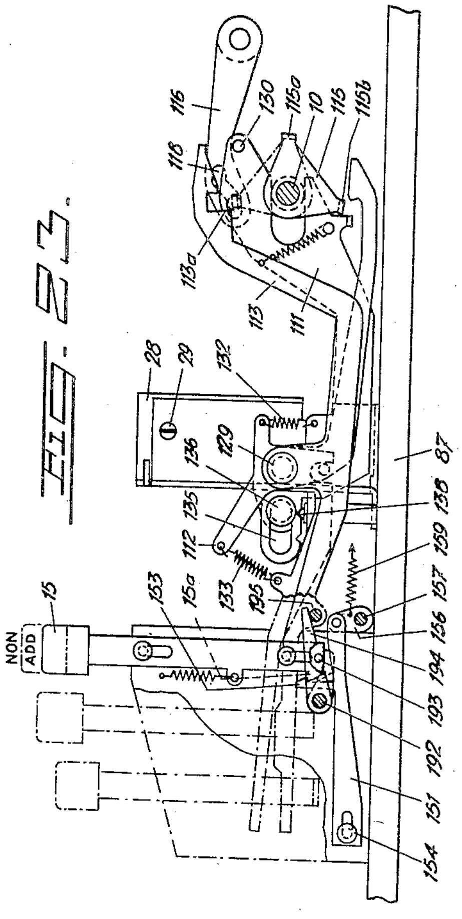

Fig. 23 shows a partial side view analogous to Fig. 5, and illustrates especially the position of the shifting levers after the non-addition (non-add) key has been depressed.

Figure 24:
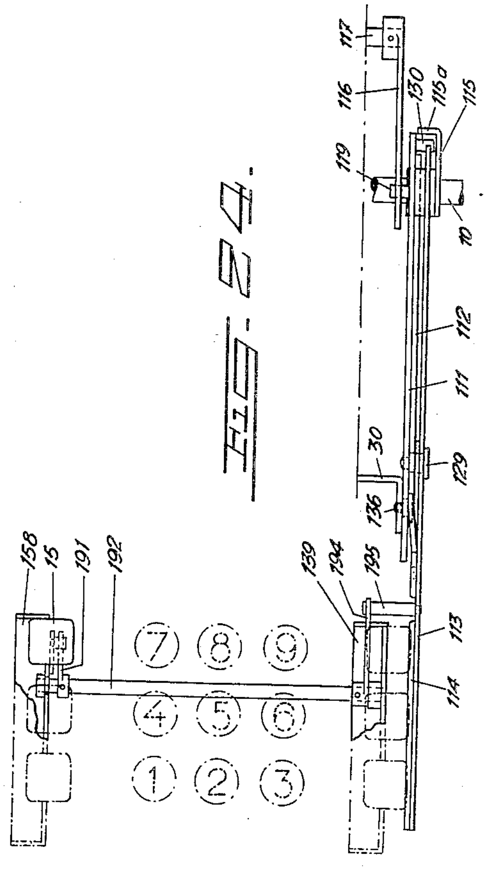

Fig. 24 shows a plan view of the parts illustrated in Fig. 23.

Figure 25:
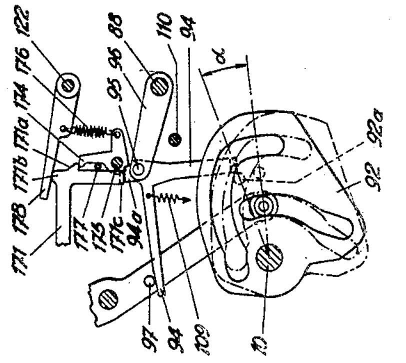

Fig. 25 shows a detail view of the release mechanism for the locking member for the tens transfer releasers at total-taking.

For the sake of clearness, in certain of the figures only those parts are shown which are next to the spectator while the remoter parts are omitted; for the same reason some parts are completely or partially cut away in certain of the figures.

The machine shown in the drawings is manually operated, the lever 11 secured on the main shaft 10 (Figs. 3 and 4) being imparted a swinging motion manually at each operation of calculation. Naturally, the machine may also be driven by a motor in well-known manner.

*Keyboard*

Figure 4:
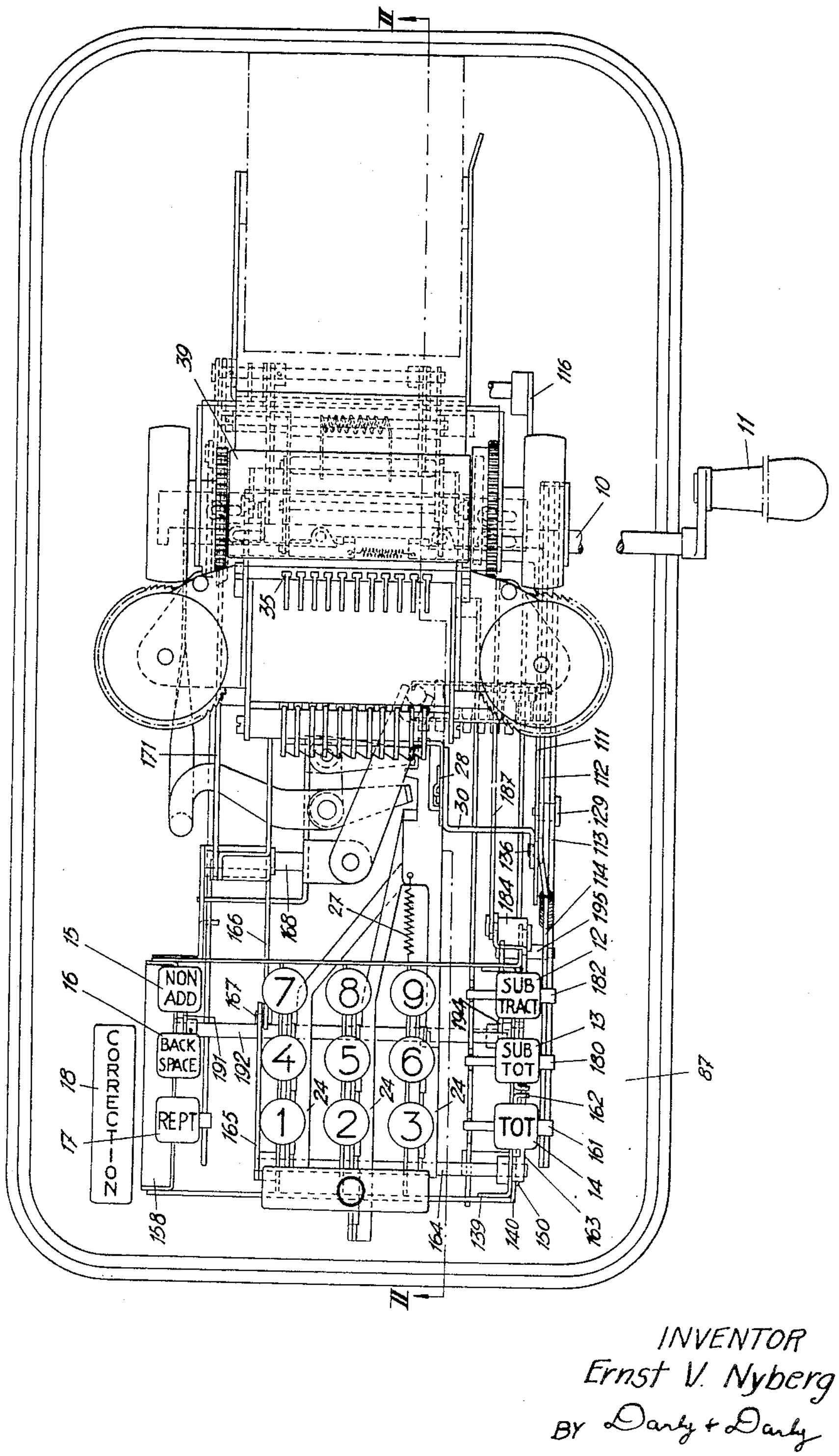
Fig. 4 shows a plan view of the machine with the casing removed.

The machine shown in the drawings is a ten-key machine with ten keys for setting the amounts, said keys being marked 0–9 (Fig. 4). In the keyboard there are moreover the following keys:

Subtraction key 12 marked SUBTRACT
Subtotal key 13 marked SUBTOT
Total key 14 marked TOT
Non-addition key 15 marked NON-ADD
Back space key 16 marked BACKSPACE
Repetition key 17 marked REPT
Correction key 18 marked CORRECTION.

*Amount setting mechanism*

To the amount keys 1–9 pins 20 (Fig. 2) are fixed acting directly on bell crank levers 21 which are rotatably journalled on the stationary pins 22 in the machine frame (i. e. in the mounting plates 26). The amount key 0 acts with its lower end directly on the corresponding bell crank lever 21. Said bell crank levers 21 are by means of pins 23 articulately connected with pushers 24. The keys are guided to rectilinear vertical motion through pins and slots at 25. The pushers are under the action of tension springs 27 which serve to return the respective key after the operator's finger has released the key, and the pushers are displaceable in slots in a stationary guide plate 28. Said guide plate is fixed to the angle piece 30 on the bottom plate of the machine by means of the screws 29.

Thus, when one of the amount keys 0–8 is depressed, the corresponding pusher 24 is pushed backwards (to the right in Fig. 2) and acts thereby directly on the corresponding stop pin 31 in a carriage 32; but when the key 9 is depressed it does not act on any stop pin 31, the stop pins corresponding to the amount key 9 being omitted. Instead of those omitted pins there is a longitudinally extending fixed stop 33 on the carriage 32.

This carriage 32 with the stop pins 31 cooperates in well-known manner with type bars 35 and racks 34 coupled to said type bars which are stopped by that or those stop pins 31, which has been pushed out and by the corresponding fixed stop 33 when the amount key 9 has been depressed in the corresponding denomination. It might be mentioned that the vertically movable racks 34 together with the type bars 35 movably arranged thereon (for printing the amounts) are drawn upwards by lifting springs (tension springs) 36 to be stopped by the stop pins 31 or the stop 33. Each type bar 35 is rockably journalled on the corresponding rack 34 by means of a pin 37, and the pin 38 for fixing the lower end of the spring 36 is situated laterally of this pin 37. Therefore, the spring 36 will not only tend to lift the type bar 35 upwards but also to rock it in a direction away from the printing roller 39.

*Totalizers, tens transfer*

Figure 2:
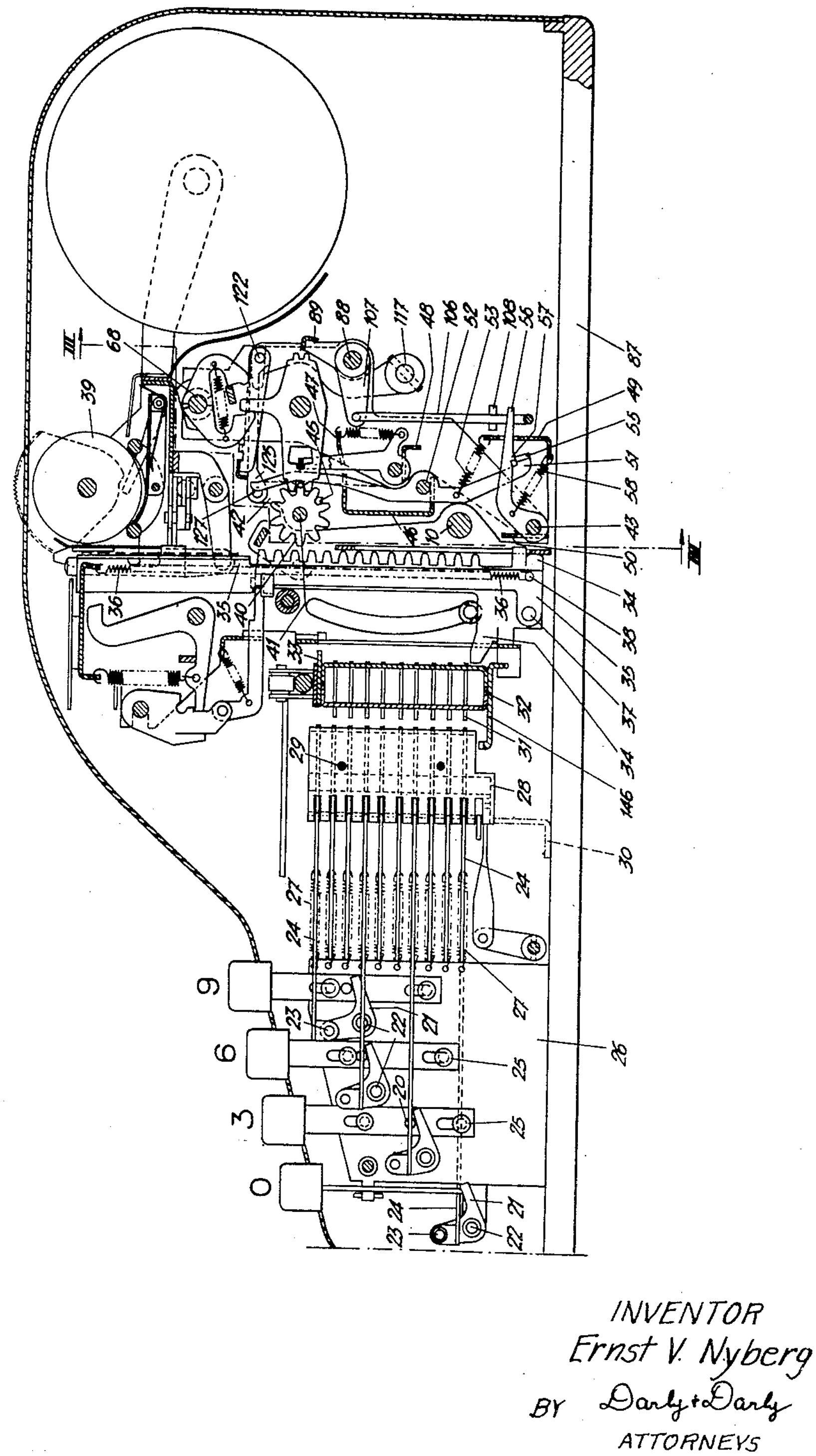
Fig. 2 shows a longitudinal section on the broke line II—II of Fig. 4.
Figure 3:
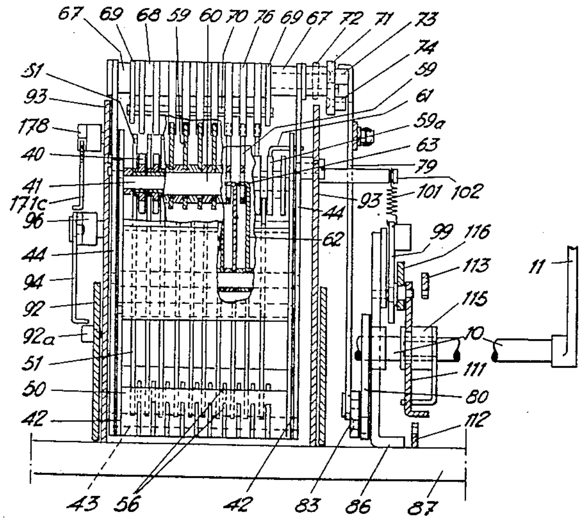
Fig. 3 shows a cross section on the line III—III of Fig. 2, some parts being broken away.
Figure 6:
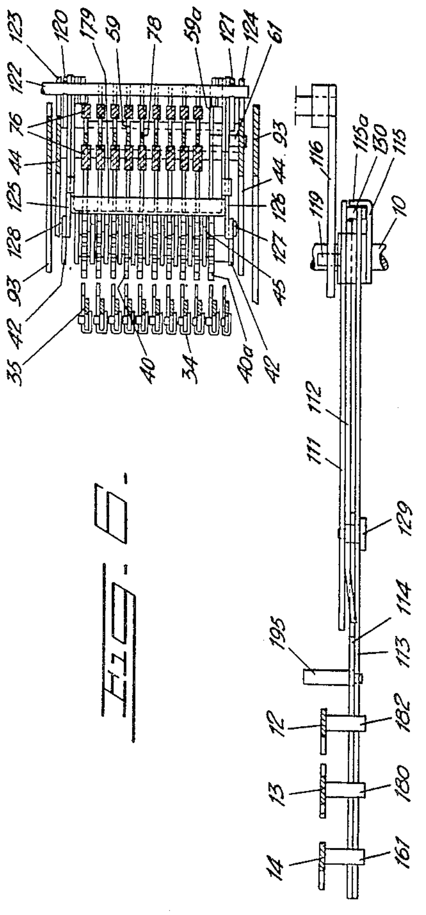
Fig. 6 is a plan view of the parts shown in Fig. 5 and is substantially a horizontal section on the line VI—VI of Fig. 5.

The totalizer wheels 40 for meshing with the racks 34 are journalled on a shaft 41 in end walls 42 (Figs. 3 and 6), which are swingably mounted around a stationary shaft 43 (Figs. 2 and 3) fixed in the end walls 44 intended for joining together the whole totalizer group (Figs. 3 and 6). Each totalizer wheel 40 is provided with its tens transfer tooth 45 (Figs. 6 and 8) on one (the left) side of the wheel; the point of the tens transfer tooth 45 is located (viewed in the direction of the shaft 41) right between two adjacent teeth of the totalizer wheel 40.

Figures 7, 8, 9, 10:
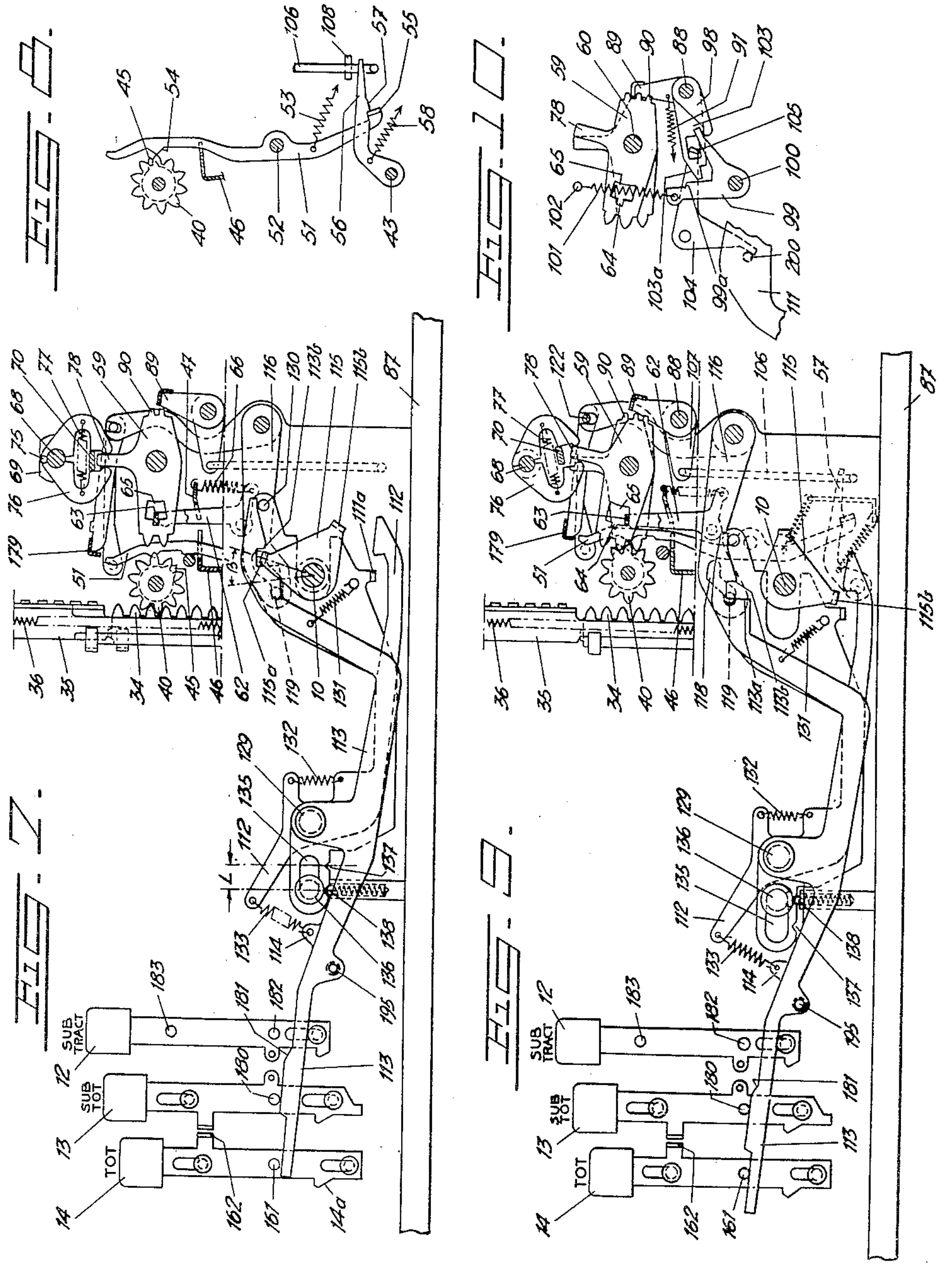
Fig. 7 is a partial side view analogous to Fig. 5, and illustrates especially the positions of the totalizer wheels and of the shifting mechanism in operations of addition.
Fig. 8 shows a detail view of a totalizer wheel with parts of the tens transfer mechanism in that position in which a tens transfer has been prepared due to a previous operation of addition (or subtraction) having resulted in a tens transfer in the decimal position in question.
Fig. 9 shows a partial side view analogous to Fig. 5, and illustrates especially the positions of the parts after the totalizer has been restored to its initial position and the tens transfer has been completed after the end of an operation of addition having resulted in a tens transfer.
Fig. 10 shows a detail view of the mechanism for locking the tens transfer gear sectors and their release members.

The end walls 42 are rigidly interconnected by means of the slotted guide plates 46, 47, 48, 49, 50 located between the end walls (see particularly Fig. 2). In the slots in the guide plate 46 the tens transfer releasers 51 are guided in such a way that they are just in the path of rotation for the corresponding tens transfer tooth 45; these releasers are rotatably journalled on the shaft 52 fixed in the end walls 44 (Figs. 2 and 8). Spring 53 draw the tens transfer releasers 51 in the anticlockwise direction to contact the bottom of the upper guide grooves in the guide plate 46 so that the point or tooth 54 of the releaser 51 normally is located at a suitable distance from the centre of the totalizer wheels. When during an operation of calculation a tens transfer tooth 45 passes (rotates) by the tooth 54 of a tens transfer releaser (see Figs. 2, 7 and 8), the tooth 45 rocks this releaser 51 to the right (clockwise) so much that the lower bent end or projection 55 of the releaser is caught and locked by the locking arm 56 which is rotatably journalled on the shaft 43; this arm is provided with a catch 57 and is acted upon by a tension spring 58 so that when the releaser 51 is rocked clockwise as just described the catch 57 snaps in laterally of (behind) the projection 55. The arms 56 are guided axially in slots in the guide plates 49, 50. When a tens releaser has been rocked clockwise in this way and been stopped by its locking arm 56, a tens transfer has been prepared in the denomination in question.

The tens transfer thus prepared is not completed until the totalizer wheels 40 are moved to engage the gear sectors 59 (Fig. 7) which are rockably journalled on the stationary shaft 60 fixed between the end walls 44. The gear sector 59a for the units totalizer wheel 40a (Fig. 6), however, cannot rock on the shaft 60 because a bent portion (projection) 61 of this gear sector 59a enters a recess in the end wall 44; therefore, the gear sector 59a has not for its object to complete any tens transfer, which cannot be effected to the units wheel 40a, but only serves to determine the position of this wheel, i. e. to hold this wheel in the correct angular position for proper engagement with the teeth of the corresponding setting rack 34.

Fig. 7 shows the gear sectors 59 in their neutral positions (positions of rest) in which they are retained each by its corresponding gear sector detent 62 which then with its upper bent portion or projection 63 under the actuation of the tension spring 66 engages an intermediate groove 64 in a recess 65 provided in the gear sector 59. Each detent 62 is swingable in the same plane as its corresponding tens transfer releaser 51. Therefore, when a releaser 51 is swung clockwise by the tens transfer tooth 45 for preparing a tens transfer in the manner indicated above, this releaser will strike against the detent 62 during the continued operation of the machine, when the totalizer wheels 40 are disengaged from the racks 34 and caused to engage the corresponding gear sectors 59, so that also this detent is swung clockwise (in Figs. 5, 7 and 8) and thereby its projection 63 is disengaged from the intermediate groove 64 in the gear sector 59.

It should perhaps be pointed out that when the totalizer wheels 40 and the tens transfer releasers are disengaged from the gear racks 34 and moved to engage the gear sectors 59, those tens transfer releasers 51 which have not been actuated (rocked) by the tens transfer teeth 45 do not reach the detents 62 but leave these detents unactuated in their locking positions. In those denominations in which no tens transfer has been prepared, consequently no tens transfer is effected (unless during the completion of the tens transfer proper a new tens transfer is being prepared and completed in a higher denomination due to a tens transfer then effected in a lower denomination).

It is to be observed that though the tens transfer releasers 51 are rockable in the same plane as the corresponding detents, the gear sector detent 62 of such a releaser 51 with its projection 63 engages and cooperates with the gear sector of the next higher denomination, i. e. with the gear sector 59 located immediately to the left (Fig. 3) of the gear sector detent 62. When rocked by the tens transfer tooth 45 for a certain denomination each tens transfer releaser 51 will, thus, disengage the gear sector 59 for the next higher denomination. The recess 65 in each gear sector 59 is so large that, by striking the projection 63 of the detent 62, it limits the tens transfer movement (the rocking angle) of the gear sector to one pitch in the additive direction and to one pitch respectively in the subtractive direction, counted from the intermediate groove 64.

The members effecting the rocking of the gear sectors 59 necessary for the tens transfer are shown, for instance, in Figs. 5, 7 and 9.

A reversing shaft 68 (Figs. 3, 5, 7, 9) parallel with the totalizer shaft 41 is mounted in bushings 67 (Fig. 3) which are rigidly secured to the end walls 44. To the ends of this shaft two arms 69 are secured which carry a bar 70 fixed between them. To the right end of the shaft 68 a disk 71 is fixed by means of a pin traversing the shaft (Figs. 3 and 18). This disk carries two pins 73, 74. In the shaft 68 there are peripherical grooves 75 (Fig. 7) in which arms 76 (Figs. 3, 5, 7, 9) are loosely laid in pairs; these arms are circularly recessed on their opposite (upper) edges so as to fit to the shifting shaft 68. Between each pair of arms 76 a tension spring 77 is fixed pressing the free points of the arms 76 to contact the upwardly extending projections 78 of the gear sectors 59. Each groove 75 is situated in the same plane at right angles to the shaft 68 as the corresponding pair of arms 76 and the corresponding projection 78. Thus, the tension springs 77 serve to retain the arms in the grooves 75 as well as to press said arms from both sides against the projections 78 of the gear sectors 59 so that said gear sectors are rocked when the arms 76 are being rocked.

The arms 76, which also move the gear sectors 59, are always rocked to their operative positions at the last stage of the operation of the machine, i. e. at the last part of the return stroke of the crank 11. Figs. 1, 2, 5 and 9 show the positions to which the arms 76 and the gear sectors 59 are rocked at operations of addition. Consequently at the end of the operation of the machine those gear sectors 59 which have been disengaged and moved in the way described above, remain in the position shown in Fig. 9. Those gear sectors 59 which have not been disengaged from the locking arms 63 in the manner described above, are retained by the same, while the springs 77 are being tensioned. As soon as one of these locking arms at the completion of a tens transfer is released by a tens transfer releaser 51 which has been actuated by its tens transfer tooth 45 in the manner described above, the corresponding gear sector 59 in the next denomination is released and now under the action of the spring 77 (via the left arm 76 in Fig. 7 and the projection 78), is rocked one step in the additive direction (clockwise) to the position shown in Fig. 9 for the gear sector 59 located next to the spectator.

This rocking of the reversing shaft 68 is effected by the vertical arm or link 79 (Figs. 1, 3, 17, 19, 21) which in its upper end is formed with a groove 79a engaged by the pin 73 (or 74) on the disk 71. The link 79 is driven to a vertical reciprocating motion by the cam disk 80 fixed on the main shaft 10, the cam groove 81 of the said disk being engaged by a pin 82 which is fixed to the lever 83. The latter is rockably journalled on the stationary pin 84 and articulately connected with the link 79 by means of the pin 85. The pin 84 is fixed to the angle plate 86 secured to the bottom plate 87 of the machine. The cam groove 81 is formed in such a way that when the main shaft 10 with the cam disk 80 assumes its position shown in Fig. 19, the link 79 has been drawn down to its lowermost position. This means that the reversing shaft 68 via the arms 76 has returned the swung-out gear sectors 59 to their neutral positions (middle positions) in which they are locked again by the locking arms 63 snapping into the central grooves 64 and locking the gear sectors 59 until the next tens transfer is to be effected.

The tens transfer is effected as described above in operations of addition. In operations of subtraction, on the other hand, the totalizer wheels 40 are moved to engage the gear racks 34 already at the first part of the rotation of the main shaft 10 and remain in mesh, when the gear racks are lifted. However, at the same time also the motion is begun; which restores the reversing shaft 68 to its neutral position shown in Fig. 7. In order that the gear sectors 59 then shall not annul (by backward rotation) the (additive) tens transfer operations effected at the next preceding operation of calculation, it is necessary that these gear sectors initially remain locked. For this purpose a U-shaped member 89 is fixed to the shaft 88 which is rotatably mounted in the end walls 42. Said U-shaped member extends axially across all of the gear sectors 59 and is rocked by the tension spring 91 so as to engage the pins or teeth 90 on the rear sides of the gear sectors (their right sides in Figs. 2, 5, 7, 9, 10, 20, 22), after the U-shaped member has been released from the locking. For this purpose a cam disk 92 (Figs. 3 and 25) is fixed on the main shaft near the outer side of the left end wall 93. To this cam disk a pin 92*a* is fixed which acts on the bell crank lever 94 arranged above it when the cam disk is rotating. If the main shaft 10 and said cam disk are rocked through the angle *α* (Fig. 25) from their initial position the bell crank lever 94 is lifted. Said lever is rockably journalled on the pin 95 on one end of the arm 96 whose other end is fixed on the shaft 88. The other arm of the lever 94 projects to the left in Fig. 25 (and 11) engages the lower side of a pin 97. Thus, the lifting action of the pin 92*a* on the bell crank lever 94 effects a rotation of the shaft 88 and this movement ceases at the moment when that arm of the lever 94 which engages the pin 92*a* has been displaced so much to the right that it is disengaged from the pin 92*a* due to the checking action exerted by the pin 97 on the other arm of the same bell crank lever. The arm 98 (Fig. 10) fixed to the opposite end of the shaft 88 then actuates the locking arm 99 which is pivoted on the pin 100; this pin is stationarily fixed on the angle plate 86 (Fig. 3). Due to this the locking arm 99 rocks to the left (counterclockwise) in Fig. 10 against the action of the tension spring 101 fixed between that locking arm and a stationary pin 102. The pin 102 is fixed to the right end wall 93 (Fig. 3). As soon as the front end 103*a* (Fig. 10) of the arm 103 slides off the shoulder 99*a* of said arm, due to the just mentioned counter-clockwise rocking of the locking arm 99, the U-shaped member 89, which through a hub is rigidly connected with the arm 103, is moved by its spring 91 to engage the projections 90 of the gear sectors 59. The arm 103 and the member 89 are restored by means of the bell crank lever 104, which with its projection 105 enters a groove in the arm 103. The bell crank lever 104 is restored by the pin 200 (Figs. 1 and 15) on the shifting arm 111.

The above mentioned rotation of the shaft 88 also serves to restore those tens transfer releasers 51 which have been locked in their prepared position for tens transfer according to Fig. 8 as described above. For this purpose a U-shaped member 106 (Figs. 2 and 9) is rockably arranged in the arms 107 fixed to the shaft 88. The lower, horizontal part of this U-shaped member extends below all the locking arms 56. Thus, when the shaft 88 with the arms 107 is swung in the manner just described, the U-shaped member 106 lifts all the locking arms 56 so that the tens transfer releasers 51 are disengaged and restored to their positions of rest by the springs 53. The U-shaped member 106 is guided in the vertical direction by grooves in a stationary support 108 (Figs. 2 and 8). A spring 109 (Figs. 11 and 25) restores the bell crank lever 94 and the arm 96 to their initial positions shown in Fig. 11 to engage the stationary stop pin 110 (located on the left end wall 93 in Fig. 3).

*Shifting mechanism*

At the different kinds of operation (addition, subtraction, subtotal-taking, total-taking, non-addition) the totalizer wheels 40 are to be engaged with and disengaged from the gear racks 34 during different parts of their movements up and down and they are also to be engaged with and disengaged from the gear sectors 59. According to the invention this is effected by means of a special shifting mechanism. Said mechanism comprises the operating arms 111, 112, 113, 114 (Figs. 1, 3, 5–7, 9, 11–18, 20, 22–24) which are to be actuated by the keys 12—15 and are adapted to be set in relation to the driver 115 fixed on the main shaft 10. The engagement and the disengagement of the totalizers are effected by the arm 116 which is secured to the shaft 117. At the free end of the arm 116 there is a slot 118 engaging a pin 119 on the main arm 111 of the shifting mechanism. The shaft 117 is rockably mounted in the two end walls 93. To the said shaft there are also fixed the two vertical arms 120, 121 (Figs. 5, 6, 12) which with their upper slotted ends engage a shaft 122. This shaft is displaceably mounted in slots or grooves 123, 124 in the end walls 44. On the shaft 122, close to the arms 120, 121, also the links 125, 126 are rockably mounted at one end. At their other end said links are rockably mounted on pints 127, 128 (Figs. 6, 12) which are fixed in the end walls 42 for the totalizer wheel aggregate.

The arms 111, 112, 113, 114 (Figs. 5–7, 11–18) in the shifting mechanism are movable (rockable) relatively to one another. Yet they constitute a coherent aggregate, which may be displaced as a unit by the driver 115 fixed on the main shaft 10. The arms 112, 113, 114 are rockably mounted on the pin 129 fixed on the main arm 111. In its normal position, i. e. when none of the kind of operation keys 12—15 has been depressed and consequently the machine is automatically set for operations of addition, the shifting arm 113 with its rear (right in Figs. 5–7 and 11–18) end engages the pin 130 fixed on the main arm 111 under the action of the tension spring 131 fixed between the arms 111 and 113. A tension spring 132 fixed between the arms 111 and 112 holds the arm 112 in its normal position (for operations of addition). Furthermore, the arm 114 is connected with the arm 112 by means of the tension spring 133 stretched between them. Said spring draws the arm 114 so that its rear (right in Fig. 5) end which is shaped as a hook 114*a*, rests against the pin 134 fixed on the arm 112. In the arm 111 there is an oblong slot 135 which engages the pin 136 fixed on the stationary part 30 of the machine frame. In its other end the arm 111 is guided on the shaft 10 to rectilinear motion. Furthermore, on the lower side of the arm 111 there are two notches 137 cooperating with the stationary spring latch 138, which thus serves to detachably retain this arm in its two outer positions.

*Addition*

The machine performs an operation of addition when none of the kind of operation keys 12—15 has been depressed and therefore the shifting arms 111, 112, 113, 114 are in their normal positions. For the sake of simplicity, it is supposed that the amount 9 already has been registered in the totalizer 40, and that then the amount key 2 has been depressed in order to enter the amount 2 in the totalizer. Thus, a tens transfer will now be effected. For the operation of addition the operator rocks the crank 11 to and fro in the ordinary way. During the forward stroke of this crank the gear racks 34 are lifted in the usual way and during this motion the totalizer wheels 40 are disengaged from the racks. When the crank 11 then is rocked backwards again and thus the main shaft 10 is rotated clockwise, the driver 115 fixed on this shaft strikes with its projection 115*a* against the notch 113*b* of the shifting arm 113 (Fig. 7), and this moves the arm 113 and thus also the main shifting arm 111 rectilinearly backwards (to the right in Fig. 7) a distance L which is equal to the distance between the two notches 137, before the said parts 115*a* and 113*b* are disengaged from each other in the moment shown in Fig. 7. During this period of engagement the shaft 10 is rotated an angle $\beta'$ clockwise (Fig. 7). The pin 119 fixed to the shifting arm 111 is hereby moved the distance L, and through its engagement with the cam groove 118 it thus rotates the arm 116 which then rotates the shaft 117 (Figs. 5 and 12), the arms 120, 121, the shaft 122, the links 125, 126 and the pins 127, 128 and also the end walls 42 of the totalizer aggregate, said end walls carrying the totalizer wheels 40 journalled on the shaft 41. Thus, said totalizer wheels 34 now are brought to engage the gear racks 34 before the latter are returned downwards at the operation of the machine.

During the continued rotation of the main shaft 10 the units gear rack 34 is now displaced downwards those two steps which it has been lifted. The units totalizer wheel 40*a* is thus rocked an angle corresponding to two steps because it was assumed above that the amount 2 is to be added to the amount 9 already registered in said wheel. As in this case a tens transfer is to be effected, the tens transfer tooth 45 passes by the point 54 of the tens transfer releaser 51 which in the manner indicated above is thereby swung out and locked in its position shown in Fig. 8. The tens transfer has thus now been prepared and is provisionally registered in the tens transfer releaser 51 for the units; the definite registration in the tens totalizer wheel (i. e. the totalizer wheel of the next higher denomination) takes place during the continued rotation of the main shaft 10, causing the totalizer wheels 40 to be disengaged from the gear racks 34 and restored to their initial position. This is effected by the other end projection 115*b* of the driver 115 striking the projection 111*a* of the main arm 111 so that said arm is moved (the distance L) forwards (to the left in Fig. 7) and thus the totalizer wheels 40 are restored to engage the gear sectors 59 via the coupling devices (119, 118, 116, 117, 120—122, 125—128, 42) just described. The tens transfer is completed when the tens transfer releaser 51 with its rear edge strikes the corresponding detent 62 and presses the same out of the central notch 64 so that as described above the gear sector 59 now released is rocked in the additive direction (clockwise in Fig. 7) one step under the actuation of the pressure of the spring 77 on the gear sector projection 78.

*Locking the subtotal and total keys*

In the described machine it is necessary to effect a blind or idle stroke by the crank 11 before the subtotal key 13 or the total key 14 can be depressed. When an operation of addition, subtraction or non-addition has been effected (i. e. after one of the amount keys 0–9 has been depressed), the keys 13 and 14 thus remain locked until the locking is removed through the blind stroke. Fundamentally, this arrangement with the blind stroke is not necessary, but this arrangement was chosen in order to obtain a reliable function. The mechanism for locking these keys 13, 14 has been made dependent on the position of the stop pin carriage, illustrated in Fig. 1 and described below:

On the stationary end wall 139 (fixed to the bottom plate 87) for the kind of operation keys 12—14 there is displaceably mounted a locking bar 140 below said keys and in the same plane as the said keys. The bar 140 serves to lock the two total keys 13, 14. The pins 142 fixed on the end wall 139 enter oblong slots 141 in this locking bar and guide it to a rectilinear motion horizontally. To the rear (right in Fig. 1) end of the bar 140 there is fixed a pin 143 on which the link 144 is pivoted. This link is moved by a tension spring 145 to engage (from below) the plate 146 on the stop pin (amount) carriage 32. A shoulder or projection 147 on the link 144 engages the bent edge of the plate 146 and the bar 140 is thus held in its extreme left position shown in Fig. 1, in which position the total keys 13 and 14 are free and may be depressed. If now one of the amount keys 0–9 is depressed and consequently the amount carriage 32 is displaced laterally (to the left in the machine), the bar 140 is drawn out of engagement with the shoulder 147 and the spring 145 now draws the bar 140 backwards (to the right in Fig. 1) so that the projections of said bar stop right below the keys 13, 14, which consequently cannot be depressed. These keys can then be released only by an extra blind stroke with the crank 11, as mentioned above, because then the lever 149, which is pivoted on a pin 148 fixed on the machine frame, is rocked, when the upper part of said lever is actuated by the edge of the cam disk 80 (Fig. 21) when said cam disk rotates. When thus the lever 149 is swung clockwise in Fig. 1, the lower end of this lever swings the link 144 forwards (to the left in Fig. 1) until the projection 147 snaps in under the plate 146 and the locking bar 140 thereby is locked in its left position in Fig. 1 so that the keys 13, 14 are free again.

For locking the kind of operation keys 12, 13, 14, 15 in their depressed position locking bars 150, 151 (Figs. 1, 11, 23) are arranged in the same plane as the respective keys and provided with locking teeth 153 right in front of these keys (but not in front of the keys 16, 17). These locking bars are provided with oblong slots in which the pins 142, 154 enter so that these bars are displaceable in their longitudinal direction (horizontally). The bars 150, 151 are interconnected to be displaced together, by means of two arms 155, 156 which are articulately connected with these bars and rigidly connected with a shaft 157 which is rotatably mounted in the machine frame (between the end walls 139 and 158, Fig. 24). The arm 156 is actuated by a tension spring 159 (Fig. 23). The kind of operation keys 12, 13, 14, 15 are provided with projections or locking teeth 12*a*, 13*a*, 14*a*, 15*a* for cooperation with the locking teeth 153. When one of these keys is depressed, the corresponding locking tooth 153 of the bar 150 or 151 snaps in above the locking tooth of the key under the action of the spring 159 so that the key is locked in its depressed position. If another kind of operation key was depressed earlier, said key is released in well-known manner and is moved upwards to its position of rest again under the action of its key spring 160.

*Total-taking*

For this operation the total key 14 is depressed and is locked in the manner indicated above in its depressed position, as shown in Fig. 11. On the key 14 there is fixed a pin 161 which moves the shifting arm 114 downwards when the key is depressed. Towards the end of the downward motion of the key the pin 161 strikes the shifting arm 113 which, however, is rocked only a small angle. This causes the hook 114a of the shifting arm 114 to be swung anticlockwise in Fig. 11, and this shifting arm now swings the shifting arm 112 anticlockwise via the spring 133. The spring 133 is stronger (has a longer leverage) than the spring 132. Due to this the rear (right in Fig. 1) end of the arm 112 is lifted so that the projection 112a of this arm is moved from its normal position upwards to engage the projection 115b of the driver 115. The shifting arm 112 is now swung anticlockwise by the spring 133 until this shifting arm with its upper edge strikes the projection 111a of the shifting arm 111.

When now the main shaft 10 is rotated the angle $\beta$ in Fig. 13, the arm 111 is displaced the distance L in its longitudinal direction (horizontally backwards) because at the rocking of the driver 115 its projection 115b strikes the projection 112a of the shifting arm 112 so that the whole shifting arm aggregate is displaced backwards (to the right in Fig. 11) to the position shown in Fig. 13. During the continued rotation of the main shaft 10 anticlockwise the projection 115a of the driver 115 strikes the point 113a of the shifting arm 113 so that the shifting arm aggregate is displaced the distance L back to its initial position, while the main shaft rotates the angle $\beta^1$, Figs. 7 and 13. As the shifting arm 113 was rocked only a small distance at the depression of the total key, the point 113b of this shifting arm is now out of the path of rotation of the projection 115a of the driver 115. Therefore, when the driver 115 is swung back clockwise during the return motion (Fig. 14) of the main shaft 10, the projection 115a does not act on the shifting arm aggregate during the rotation through the angle $\beta'$. On the other hand, during the return motion through the angle $\beta$ (Fig. 13) the point 112a of the shifting arm 112 is in the path of rotation of the projection 115b, and therefore the shifting arm 112 yields resiliently to the projection 115b, said arm being resiliently connected with the shifting arm 114 engaging the pin 134.

During this reciprocating displacement of the shifting arms 111—114 the pin 119 (Fig. 5) fixed on the shifting arm moves in the cam slot 118. By this the totalizer wheels 40 are brought in and out of mesh with the gear racks 34 in the manner described above. (See the analogous displacement under the heading Addition.)

The total-taking key 14 is also provided with a projection 162 (Figs. 4, 11 and 12) which at the depression of the key acts on the arm 163 fixed to one (the right) end of the shaft 164 which is rockably journalled in the machine frame. To the other (left) end of this shaft there is fixed an arm 165 which transfers to a three-arm lever 166 the rocking motion caused by the depression of the key. In the outer end of its front (left in Fig. 11) arm said lever has slot engaged by a pin 167 which is secured to the arm 165 and is rockably journalled on the stationary pin 168. The rear (right in Fig. 11) arm 166a of this lever acts with its end on the lower side of the forwardly (to the left in Figs. 11 and 12) projecting zero position locking member 169 which is rockably mounted on a shaft 170 fixed in the stop pin carriage 32. This member 169 serves to lock those gear racks 34 for which no amount key has been depressed, in their lowermost position (zero position). When the arm 166a is moved anticlockwise in Fig. 11, it swings the member 169 away from that position in which it stops the gear racks 34. That arm 166b (Figs. 11, 12) of the lever 166, which projects vertically upwardly is articulately connected with the link 171 which is guided in the lateral direction by a groove in the stationary guide plate 172 engages. When the total key 14 is depressed, the link 171 is thus displaced forwards (to the left in Figs. 11, 12 and 25) from the position shown in Fig. 25 to the position shown in Fig. 11. The rear (pointed) part 171a of this link thereby leaves its supporting position against the upper edges of the hook 174 and is drawn downwards towards the bottom of the groove in the guide plate 172. The hook is pivoted on the stationary pin 175 (fixed in the end wall 93) and is under the action of the tension spring 176 which presses the hook to engage a stationary pin 177. The spring 176 is stretched between the hook 174 and an arm 178 which is secured on the shaft 122 and rests against the projection 171b on the upper side of the link 171. This spring thus also serves to hold the link pressed against the bottom of the groove in the guide 172. When the link 171 is displaced in this manner due to the depression of the total key 14, the arm 178 and thus also the shaft 122 are swung. On this shaft (close to and between the arms 120, 121) a U-shaped member 179 is secured. When the shaft 122 is rocked as mentioned above this U-shaped member is rocked (anticlockwise in Fig. 11) to such a position that that part of this member which is parallel with the shaft 122 falls down to a position somewhat below the uppermost points of the tens transfer releasers 51.

Figs. 11 and 13 show the U-shaped member 179 in the position which it has at a total taking operation, i. e. after the key 14 has been depressed. That part of the U-shaped member which is parallel with the shaft 122, is then lower than and behind the upper points of the tens transfer releasers 51 and thus prevents them from being swung backwards (clockwise).

Already at the beginning of the operation of the machine at a total taking operation the totalizer wheels 40 are thus moved to mesh with the gear racks 34 before the latter begin to move upwards. The lifting spring 36 now lifts the respective gear rack and type bar aggregate 34, 35 upwards untily the tens transfer tooth 45 of the totalizer wheel 40 connected with the gear rack strikes against and is stopped by the point 54 of the corresponding tens transfer releaser 51, which has been locked in its position of rest by the U-shaped member 179, already at the depression of the key 14. Thus, the type bars 35 will be stopped in the vertical position corresponding to the amount registered in the respective totalizer wheel, and the total amount is now printed in well-known manner, the gear racks 34 are disengaged from the totalizer wheels 40 now cleared and are restored to their positions of rest (lowermost positions). During the last part of the restoring rotation of the main shaft 10 a rotary movement of short duration (anticlockwise in Figs. 1 and 11) is in well-known manner imparted to the shaft 157 so that the arms 150, 151 are displaced forwards (to the left in Figs. 1 and 11) and hereby the depressed kind-of-operation-key (such as 14) is released and lifted by its spring 160.

After a total taking operation has been finished the U-shaped member 179 remains in its lowermost position locking the tens transfer releasers 51 and therefore, before the next operation of addition or subtraction, this member must be restored to its (lifted) position in which it leaves the tens transfer releasers 51 free (see, for instance, Fig. 5). This is effected by the link 171 at the next operation of the machine.

As described above, the bell crank lever 94 receives a lifting movement (is lifted by the pin 92*a*, Fig. 25) during the rotation of the main shaft 10 through the angle $\alpha$. When the total key 14 is released and returns to its initial position, also the link 171 is returned to the right in Fig. 11 so that its downwardly directed projecting right end 171*c* will be right above the upper part 94*a* of the bell crank lever 94. When thus the bell crank lever 94 is lifted, it moves the right (rear) end of the link 171 upwards so that under the action of its spring 176 the hook 174 snaps in over the point 171*a* of this link which thus is locked in this position.

*Subtotal taking*

When the subtotal key 13 is depressed, the mode of operation substantially is the same as described above under the heading Total taking. However, when the key 13 is depressed the pin 180 thereon acts on an elevated portion or cam 181 of the shifting arm 113 (Fig. 15) which thereby is rocked anticlockwise on the pin 129. This causes the point 113*a* of this arm to be lifted so much that it is out of the path of the projection 115*a* of the driver 115 when the latter is rocked, as shown in Fig. 16. When the main shaft 10 then is restored to its position of rest, the restoration of the shifting arm aggregate 111—114 is thus effected during the rotation through the angle $\beta$ in Fig. 16. During the forward and backward rocking stroke of the main shaft 10 the totalizer wheels will thus mesh with the gear racks 34, both when the latter are lifted and when they are lowered. The subtotal is printed when the gear racks 34 have stopped at the end of their lifting motion. During their movement downwards the totalizer wheels 40 are restored to their initial positions so that the registered amount remains in the totalizer after the end of the subtotal-taking operation.

*Subtraction*

When the subtraction key 12 is depressed, the pin 182 thereon (Figs. 17 and 18) acts on the shifting arms 113, 114 so that the latter assume the same positions relatively to the driver 115 as they have after depression of the total key 14 (see above under the heading Total taking).

Figure 1:
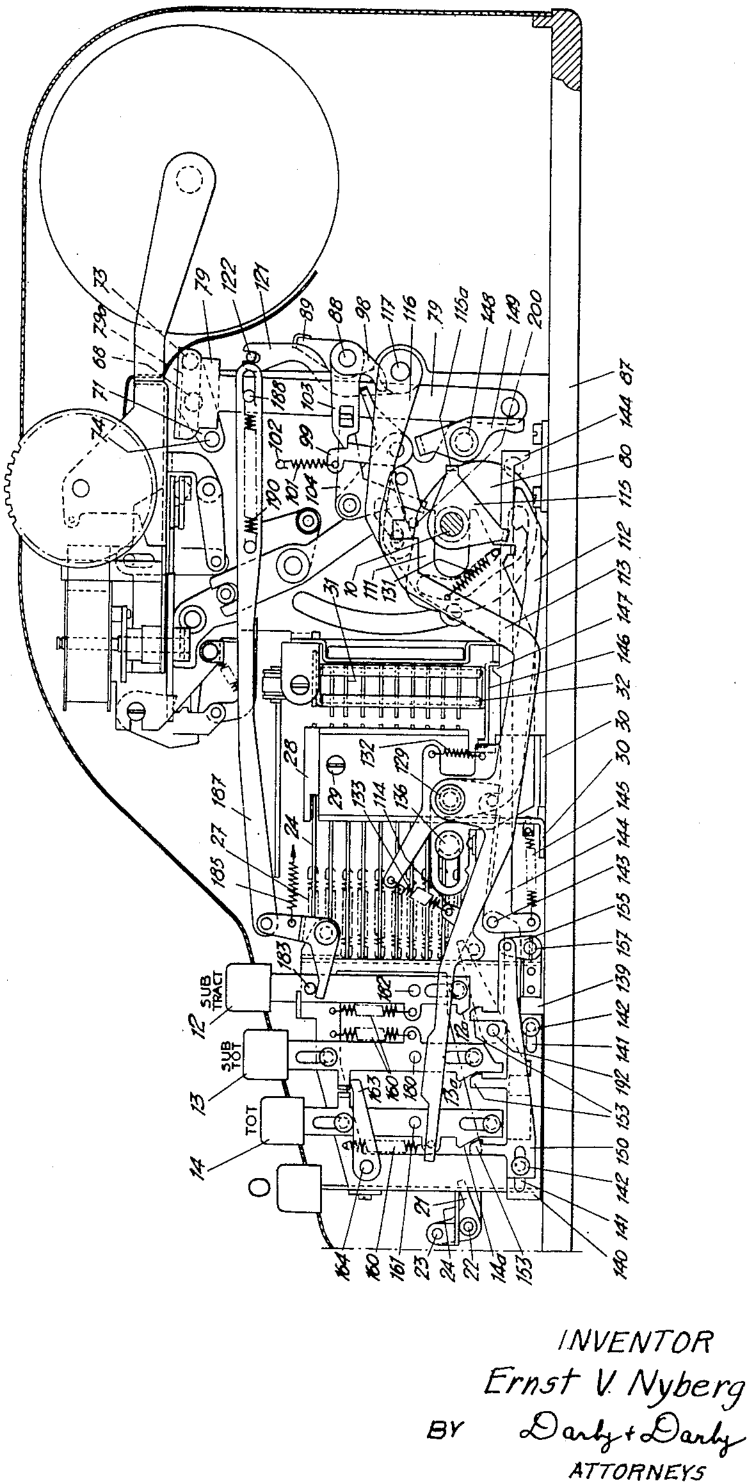
Fig. 1 shows a side view of the machine seen from the right, part of the casing being broken away.

At operations of subtraction the tens transfer is to be effected in the negative direction, i. e. in the direction opposite to the tens transfer in an operation of addition. In order to effect this, the subtraction key 12 is provided with another pin 183 (Figs. 1 and 17) which at the depression of said key rocks the bell crank lever 184 anticlockwise against the action of the tension spring 185 operating on this lever. The bell crank lever is rockably mounted on the stationary pin 186 (which is fixed on the end wall 139), and one end of a link 187 is articulately connected with the bell crank lever. The opposite end of said link is provided with an oblong slot engaged by a pin 188 on the link 79. Between this pin and a pin 189 on the link arm 187 a tension spring 190 is stretched which normally holds the pin 188 in contact with the left (front) end of the slot in the link 187, as shown in Fig. 1. Normally, i. e. when the subtraction key 12 has not been depressed the spring 185 holds the link 187 in its rear (right in Fig. 1) position in which the groove 79*a* in the upper end of the link 79 engages the pin 73. When now the subtraction key is depressed and locked in its depressed position (by the stop 153 snapping in over the projection 12*a*, Fig. 1) the parts have the positions shown in Fig. 17. (Thus, the parts are shown in Fig. 17 in those positions which they have after the depression of the subtraction key but before the beginning of the operation of the machine, i. e. before the rotation of the main shaft 10 has begun.) When thereby the link arm 187 is drawn to the left in Fig. 17 (forwards in the machine), the spring 190 is further tensioned. As described above, the link 79 receives a reciprocating vertical motion from the cam disk 80 (Fig. 19).

The downward stroke of that link begins after the main shaft 10 has rotated the angle $\gamma$, and this stroke is completed after about half of the forward (anticlockwise) rotation of said main shaft, i. e. after the angle $\delta$ in Fig. 19. In this moment the reversing shaft 68 has almost reached its neutral position (in which the pins 73, 74 have their centre lines in the same horizontal plane), and therefore the spring 190 can now draw the link 79 to the left (anticlockwise) in Fig. 17 so that the pin 74 enters and the pin 73 leaves the slot 79*a*. The upward motion of the link 79 begins almost immediately after it has reached its lowermost position and is finished at the angle $\delta'$. This moment of time is intended for transferring the totalizer wheels 40 to their right (rear in the machine) position in Fig. 22 which shows the positions of the parts after the tens transfer has been finished. In this right-hand position the totalizer wheels 40 are in mesh with the gear sectors 59. The tens transfer is now effected in the same manner as in an operation of addition (see above under the heading Addition) but in the negative (subtractive) direction owing to the fact that the reversing shaft 68 is rocked clockwise in a direction opposite to that in an operation of addition because the pin 74 and not the pin 73 engages the groove 79*a* in the link 79 during the upward motion of the latter. (Then the shaft 10 moves through the angle $\gamma'$ until it reaches its reversing point.) At the return motion the angles $\gamma'$, $\delta'$, $\delta$, $\gamma$ are passed in inverted order.

Also the positions of the shifting mechanism controlling the shifting (engaging) of the totalizer will be seen in Figs. 20 and 22. After the return rotation of the main shaft 10 has been completed and thus the subtraction key 12 has been released and restored to its position of rest, the link 79, the links 187 and the bell crank lever 184 remain in their positions for an operation of subtraction in spite of the drawing action of the spring 185, because the link 79 is still supported on the pin 73, as shown in Fig. 21. Therefore, the parts 79, 187 and 184 are not returned by the spring 185 until at the next operation of the machine, when the operator rocks the crank 11 again. When at the next operation of the machine the link 79 has reached its lowermost position again and the reversing shaft has reached its neutral position (in which the pins 73 and 74 have their centre lines in the same horizontal plane), the pin 73 can enter the groove 79*a* and the parts 79, 187, 184 be restored.

*Non-addition*

When the non-addition key 15 is depressed, the amount (item) set in the keyboard shall not be registered in the totalizer. The totalizer wheels 40 then remain in mesh with the gear sector 59 but when the main shaft 10 rotates forward and back again said totalizer wheels shall not be moved into mesh with the gear racks 34 during their motion up and down. For this purpose at depression of the non-add key 15 said key presses on an arm 191 (Figs. 23, 24) which is fixed on one end of a transverse shaft 192 pivoted in the end walls 139, 158. The key 15 is rigidly connected with a pin 193 which thus, at the depression of the key, strikes the arm 191 (Fig. 24) and rocks said arm clockwise in Fig. 23. To the other end of the shaft 192 an arm 194 is rigidly connected which during said rocking motion moves the pin 195 arranged below this arm and rigidly connected with the shifting arm 113. By this said shifting arm is rocked in the anticlockwise direction so much that the point part 113*a* of the shifting arm 113 comes completely out of the path of rotation of the projection 115*a* of the driver 115. When the non-add key is depressed the shifting arm 114 is not actuated but the latter and the shifting arm 112 remain in their normal positions. Due to this the whole shifting arm aggregate 111—114 and thus also the totalizer shaft 41 remain unactuated during the operation of the machine for non-addition.

Thus, the totalizer wheels will during the whole operation of the machine remain in mesh with the gear sectors 59. The amount set in the keyboard will therefore be printed, only but the totalizer wheels 40 are not actuated by the gear racks 34 during the whole operation of the machine. No tens transfer is effected because the totalizer wheels 40 are not brought into mesh with the gear racks 34.

*The remaining keys*

The back space key 16, the repetition key 17 and the correction key 18 operate in well-known manner, and therefore a more detailed description is superfluous.

Having now described my invention, what I claim as new and desire to secure by Letters Patent is:

A reversing device for the tens transfer mechanism of calculating machines, cash registers and the like of the type having tens transfer gear sectors operable in either direction for performing either addition or subtraction, comprising, in combination, a reversing shaft lying adjacent the tens transfer gear sectors, said shaft having parallel peripheral slots and said shaft being rockable to two positions one for addition and the other for subtraction, reversing arms for said tens transfer gear sectors, said arms being arranged in pairs the arms of each pair lying in the same plane at right angles to said shaft and said arms having recessed ends forming segments of a circle conforming with the shape of the bottom of said peripheral slots, a tension spring extending between the arms of each pair, said springs serving to hold the recessed ends of each pair of arms in a peripheral slot and to rockably journal said arms in said slot, and a U-shaped bar having its base portion extending between said reversing arms and its ends secured to said reversing shaft to be rocked thereby, the other ends of said arms lying on opposite sides of a projection on said gear sector to engage it and to cause rocking movement of the corresponding gear sector in an additive or a subtractive direction according to the position of said reversing shaft and said U-shaped bar.

ERNST VILHELM NYBERG.

REFERENCES CITED

The following references are of record in the file of this patent:

UNITED STATES PATENTS

| Number | Name | Date |
|---|---|---|
| 998,145 | Wolter | July 18, 1911 |
| 1,005,397 | Wolter | Oct. 10, 1911 |
| 1,206,813 | Church | Dec. 5, 1916 |
| 1,206,878 | Martin | Dec. 5, 1916 |
| 1,231,999 | Burdick | July 3, 1917 |
| 1,471,770 | Bernau | Oct. 23, 1923 |
| 1,810,213 | Johantgen | June 16, 1931 |
| 2,068,650 | Anderson | Jan. 26, 1937 |
| 2,310,280 | Friden | Feb. 9, 1943 |